(12) United States Patent
Kaneko et al.

(10) Patent No.: US 12,162,455 B2
(45) Date of Patent: Dec. 10, 2024

(54) ROTARY DAMPER, AND BRAKE SYSTEM

(71) Applicant: OILES CORPORATION, Fujisawa (JP)

(72) Inventors: Ryohei Kaneko, Fujisawa (JP); Wataru Nishioka, Fujisawa (JP)

(73) Assignee: Oiles Corporation, Kanagawa (JP)

( * ) Notice: Subject to any disclaimer, the term of this patent is extended or adjusted under 35 U.S.C. 154(b) by 0 days.

(21) Appl. No.: 18/558,929

(22) PCT Filed: Mar. 21, 2022

(86) PCT No.: PCT/JP2022/012934
§ 371 (c)(1),
(2) Date: Nov. 3, 2023

(87) PCT Pub. No.: WO2022/234731
PCT Pub. Date: Nov. 10, 2022

(65) Prior Publication Data
US 2024/0239310 A1 Jul. 18, 2024

(30) Foreign Application Priority Data

May 6, 2021 (JP) ................................. 2021-078848

(51) Int. Cl.
*B60T 7/06* (2006.01)
*G05G 5/03* (2008.04)

(52) U.S. Cl.
CPC .................. *B60T 7/06* (2013.01); *G05G 5/03* (2013.01); *G05G 2505/00* (2013.01)

(58) Field of Classification Search
None
See application file for complete search history.

(56) References Cited

U.S. PATENT DOCUMENTS

| 10,875,423 | B2* | 12/2020 | L?hken | B60N 2/20 |
| 2007/0084686 | A1* | 4/2007 | Jeffries | F16F 9/145 188/290 |

FOREIGN PATENT DOCUMENTS

| JP | H07301272 A | 11/1995 |
| JP | H08290760 A | 11/1996 |

(Continued)

OTHER PUBLICATIONS

International Search Report for PCT/JP2022/012934 dated Apr. 26, 2022, 5 pages.

(Continued)

*Primary Examiner* — Vicky A Johnson
(74) *Attorney, Agent, or Firm* — Nixon & Vanderhye P.C.

(57) ABSTRACT

Provided is a rotary damper (1) suitable for use as a damper for a brake pedal with a fail-safe feature.
In the rotary damper (1) intended for a brake pedal of an automobile and configured to generate a damping torque by rotation of a casing (11) in a forward direction N relative a rotor (12), the casing (11) is made of thermoplastic resin and is provided with a pair of arms (19a, 19b) projecting radially outward so as to hold a plate (5) therebetween. The plate (5) is configured to rotate about a pedal rotation center in conjunction with the brake pedal (4). Moreover, the arm (19a) out of the arms (19a, 19b), which is located downstream in the forward direction, includes a curved portion (191) with a constant width and a supporting portion (192) located more distal than the curved portion (191) is, and is configured to support the plate (5) with the supporting portion (192).

12 Claims, 14 Drawing Sheets

(56) References Cited

FOREIGN PATENT DOCUMENTS

| | | |
|---|---|---|
| JP | 2008162324 A | 7/2008 |
| JP | 2016023652 A | 2/2016 |
| WO | 2013145973 A1 | 10/2013 |

OTHER PUBLICATIONS

Written Opinion of the ISA for PCT/JP2022/012934 dated Apr. 26, 2022, 3 pages.

* cited by examiner

Fig. 7
(A)   (B)   (C)
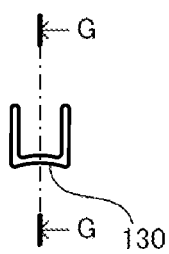 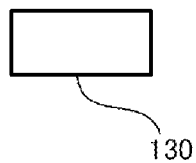 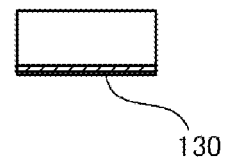

ROTARY DAMPER, AND BRAKE SYSTEM

CROSS-REFERENCE TO RELATED APPLICATIONS

This application is the U.S. national phase of International Application No. PCT/JP2022/012934 filed Mar. 21, 2022 which designated the U.S. and claims priority to JP 2021-078848 filed May 6, 2021, the entire contents of each of which are hereby incorporated by reference.

TECHNICAL FIELD

The present invention relates to a rotary damper, and in particular relates to a rotary damper suitable for use as a brake pedal damper.

BACKGROUND ART

A known rotary damper generates a large damping torque in relation to a rotation in a forward direction, whereas a small damping torque in relation to a rotation in a backward direction. For example, the Patent Literature 1 discloses a rotary damper that has a simple structure thereby resulting in low cost of manufacture.

A rotary damper disclosed in the Patent Literature 1 has the following: a casing including a circular cylindrical chamber defined inside; a rotor rotatably placed in the circular cylindrical chamber; viscous fluid filled in the circular cylindrical chamber; and a lid attached to an opening end of the casing and keeping the rotor together with the viscous fluid sealed inside the circular cylindrical chamber.

The rotor includes a rotor body in cylindrical shape and vanes, and each of the vanes is formed projecting radially outward from an outer circumferential surface of the rotor body so as to form a slight clearance gap with a sidewall surface within the circular cylindrical chamber. The vanes each have a flow passage leading to two side surfaces perpendicular to rotation directions of the rotor: one side surface (hereinafter referred to as the first side surface) and another side surface (hereinafter referred to as the second side surface) of the vane. A seal member is attached to an end surface (which is a surface facing the sidewall surface within the circular cylindrical chamber) of each vane, thereby filling the slight clearance gap between the end surface and the sidewall surface within the circular cylindrical chamber. These seal members each have a check valve of elasticity for opening and closing the flow passage formed in the corresponding vane. The sidewall surface within the circular cylindrical chamber has partitions each being formed projecting radially inward so as to form a clearance gap with the outer circumferential surface of the rotor body.

According to the above structure, for the rotary damper disclosed in the Patent Literature 1, applying a force to rotate the rotor in the direction from the first side surface to the second side surface of each vane (in a forward direction) on the rotor causes the viscous fluid in the circular cylindrical chamber to push each check valve against the second side surface of the corresponding vane, thereby closing the flow passages with the respective check valves. This allows only movement of the viscous fluid via the clearance gap between each partition of the circular cylindrical chamber and the outer circumferential surface of the rotor body and via a clearance gap between a closing end (a bottom surface) of the casing and a undersurface (which is a surface facing the closing end of the casing) of each vane, thereby increasing pressure of the viscous fluid in a section facing the second side surface of each vane. This generates a large damping torque. Conversely applying a force to rotate the rotor in the direction from the second side surface to the first side surface of each vane (in a backward direction) on the rotor causes the viscous fluid to flow from a section facing the first side surface of each vane into the corresponding flow passage and to push up the corresponding check valve, resulting in open state of each flow passage. Therefore, movement of the viscous fluid via the flow passage formed in each vane is also allowed, thus leading to little increase of a pressure of the viscous fluid in the section facing the first end surface of each vane. This generates a small damping torque.

CITATION LIST

Patent Literature

Patent Literature 1: Japanese Unexamined Patent Application Laid-Open No. H07-301272

SUMMARY OF INVENTION

Technical Problem

The rotary damper disclosed in the Patent Literature 1 might be available as a damper for a brake pedal of an automotive, provided that the damper is linked to the brake pedal in such a way that the large damping torque is generated in response to an automobile-driver's push on the brake pedal.

However, if the rotary damper disclosed in the Patent Literature 1 is intended for use as a damper for a brake pedal of an automobile, it is meaningful in terms of safe design to ensure that hard depressing the brake pedal activates the brake in case of a failure of the rotary damper and of a resultant loss of relative rotation between the casing and the rotor.

The present invention has been made in view of the above situation, and an object of the present invention is to provide a rotary damper suitable for use as a damper for a brake pedal with a fail-safe feature and a braking system using the rotary damper.

Solution to Problem

In response to the above issue, the present invention provides a rotary damper for a brake pedal of an automobile as follows: it is configured to generate a damping torque by rotating a casing in a forward direction relative to a rotor; and the casing is made of thermoplastic resin and is provided with a pair of arms projecting radially outward so as to hold therebetween a plate configured to rotate around a pedal rotation center in conjunction with the brake pedal. Moreover, one arm out of the arms, which is located downstream in the forward direction, includes a curved portion with a constant width and also is configured support the plate with its portion located more distal than the curved portion is.

For example, the present invention provides a rotary damper for a brake pedal of an automobile, the rotary damper has a rotor and a casing containing the rotor inside to allow relative rotation between the casing and is configured to generate a damping torque by rotating the casing in a forward direction relative to the rotor, and the rotary damper is as follows:
   the casing is made of thermoplastic resin and comprises a
      pair of arms projecting radially outward so as to hold, between the arms, a plate configured to rotate around a pedal rotation center in conjunction with the brake pedal; and an arm out of the arms, which is located downstream in the forward direction, includes the following:
a curved portion having a constant width; and
a supporting portion which is located more distal than the curved portion is and which is configured to support the plate.

The present invention further provides a braking system having the following:
the above rotary damper;
a shaft placed at the pedal rotation center;
a brake arm rotatably attached to the shaft and linked to a brake master cylinder;
the brake pedal attached to an end of the brake arm; and
the plate attached to the brake arm so as to rotate around the pedal rotation center in conjunction with the brake pedal.

In the braking system, the rotor is fixed to the shaft to be prevented from rotating around the pedal rotation center,
the rotary damper is installed in such a manner that when a push of the brake pedal causes the plate to rotate around the pedal rotation center in the forward direction, the plate is supported by the supporting portion of the arm, which is located downstream in the forward direction, out of the arms and that when release of the brake pedal causes the plate to rotate around the pedal rotation center in a backward direction, the plate is supported by the arm, which is located upstream in the forward direction, out of the arms; and
The plate is located between and grasped by the arms so as not to interfere with a base portion between the arms.

Advantageous Effects of Invention

According to the present invention, the rotary damper is installed so that the plate can push the arm located downstream in the forward direction in response to a push of the brake pedal, and thereby the push of the brake pedal causes the rotary damper to generate a damping torque. Furthermore, the casing is made of thermoplastic resin, and one arm located downstream in the forward direction is provided with the curved portion and supports the plate with its portion located more distal than the curved portion is; thus, a stress arising in the arm pushed by the plate is concentrated at the curved portion. Therefore, in case of a failure in rotary damper and of a resulting loss of the relative rotation between the casing and the rotor, hard depressing the brake pedal forces the curved portion to break, thereby allowing the brake to be activated. Additionally, the curved portion is constant in width, and therefore variation in the amount of the brake pedaling force required to break the curved portion is reduced which would be caused by variation in the pushing direction of the plate against the portion of the arm located more distal than the curved portion is.

Consequently, according to the present invention, successfully provided is a rotary damper suitable for use as a damper for brake pedal with a fail-safe feature and a braking system using the rotary damper.

BRIEF DESCRIPTION OF DRAWINGS

FIG. 7(A) and FIG. 7(B) are a front view and a side view of a first seal member 13, respectively; and FIG. 7(C) is a G-G cross sectional view of the first seal member 13 illustrated in FIG. 7(A).

DESCRIPTION OF EMBODIMENTS

In the following, one embodiment of the present invention will be described with reference to the drawings.

Figure 1:
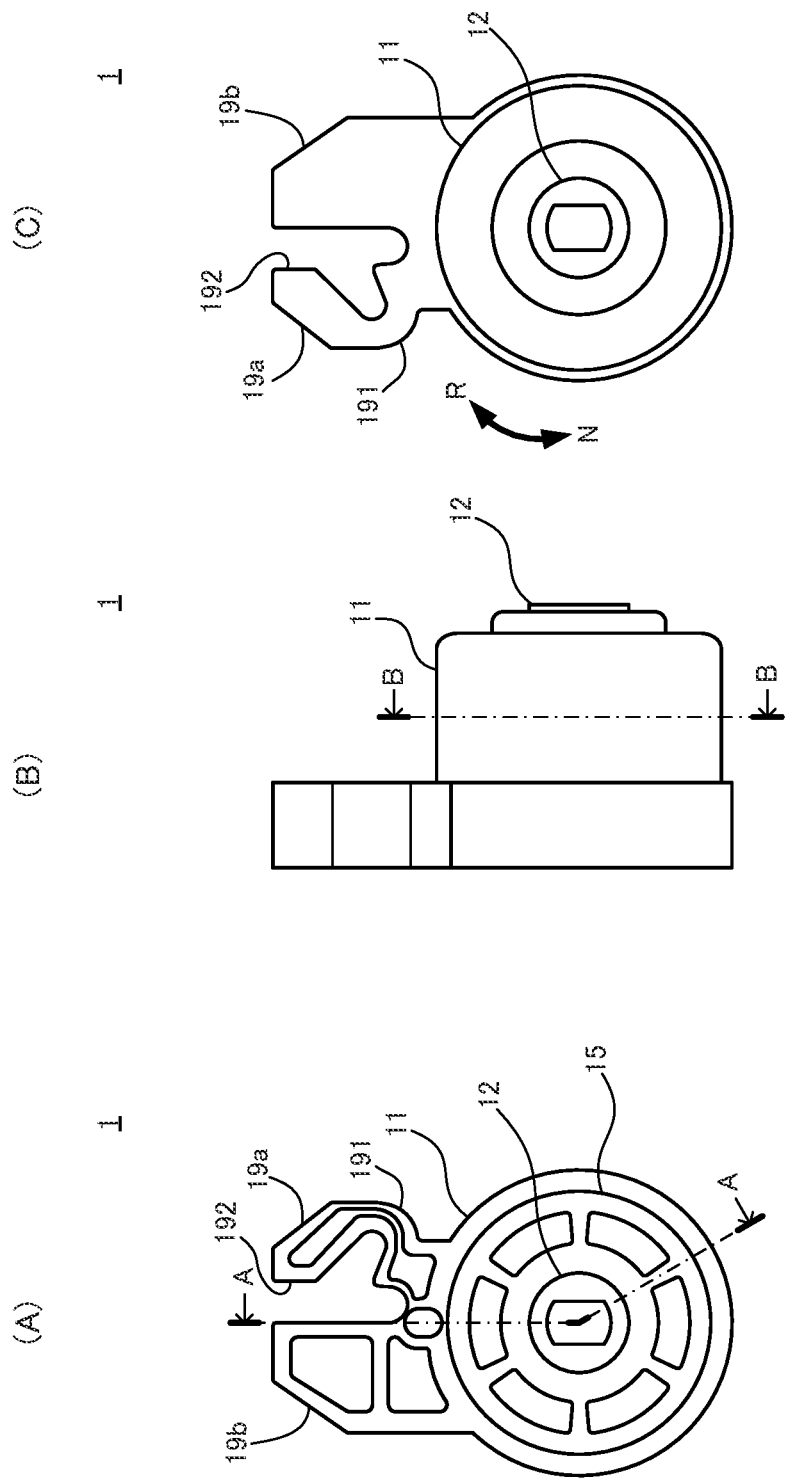
FIG. 1(A) to FIG. 1(C) are a front view, a side view, and a back view, of a rotary damper 1 according to one embodiment of the present invention, respectively.
Figure 2:
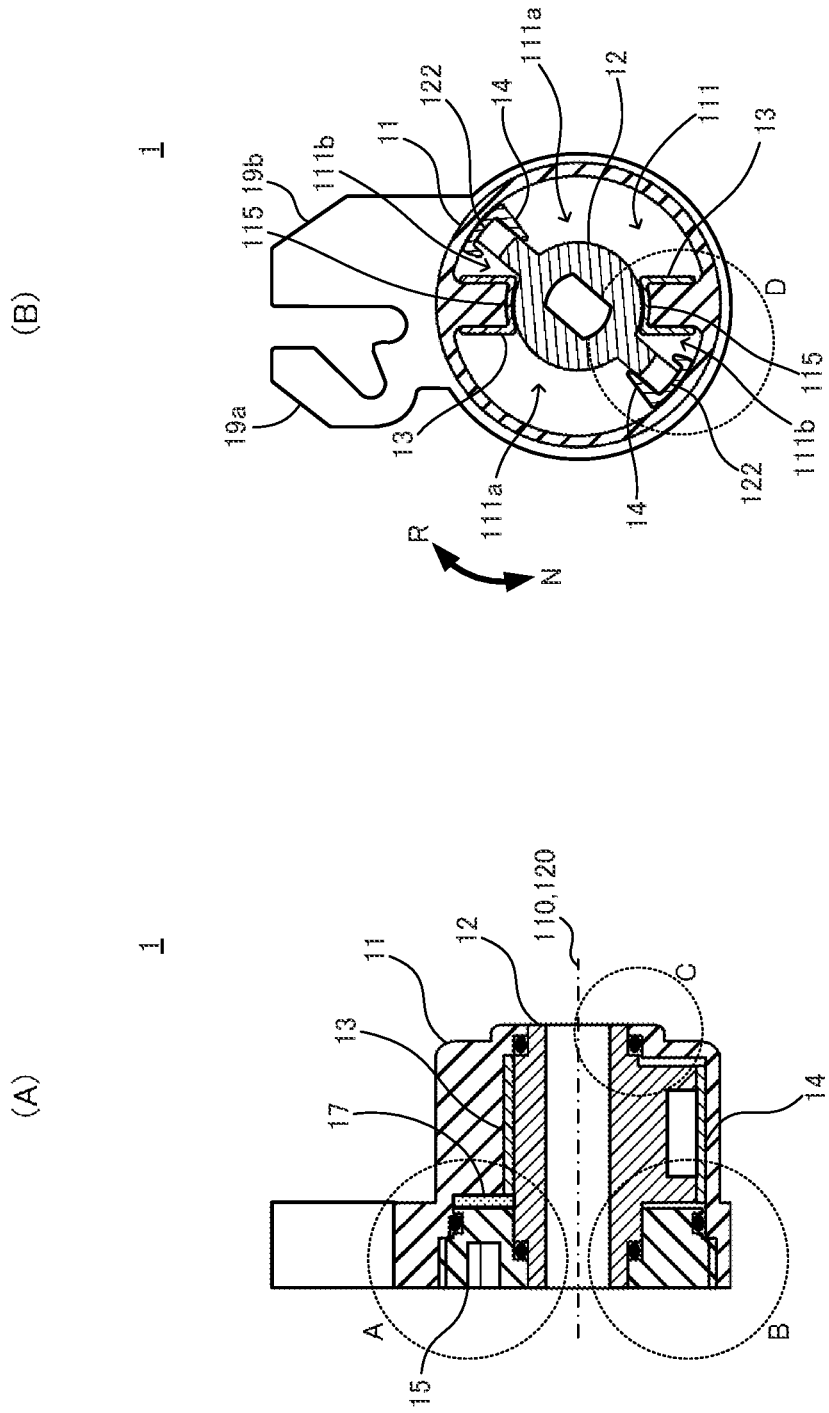
FIG. 2(A) is an A-A cross sectional view of the rotary damper 1 illustrated in FIG. 1(A)
FIG. 2(B) is a B-B cross sectional view of the rotary damper 1 illustrated in FIG. 1(B).
Figure 3:
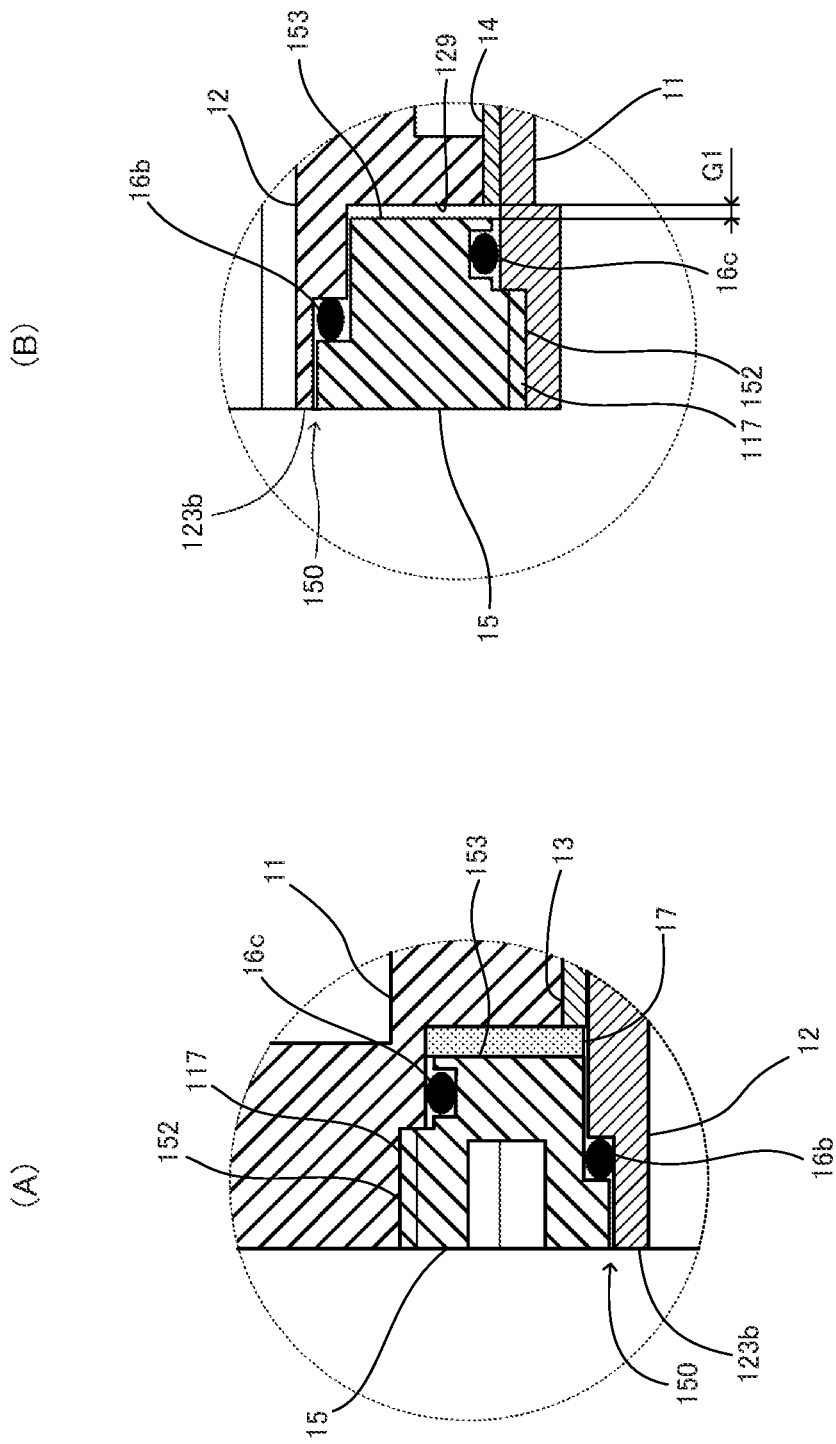
FIG. 3(A) and FIG. 3(B) are an enlarged view of the part A and an enlarged view of the part B, of the rotary damper 1 illustrated in FIG. 2(A), respectively.
Figure 4:
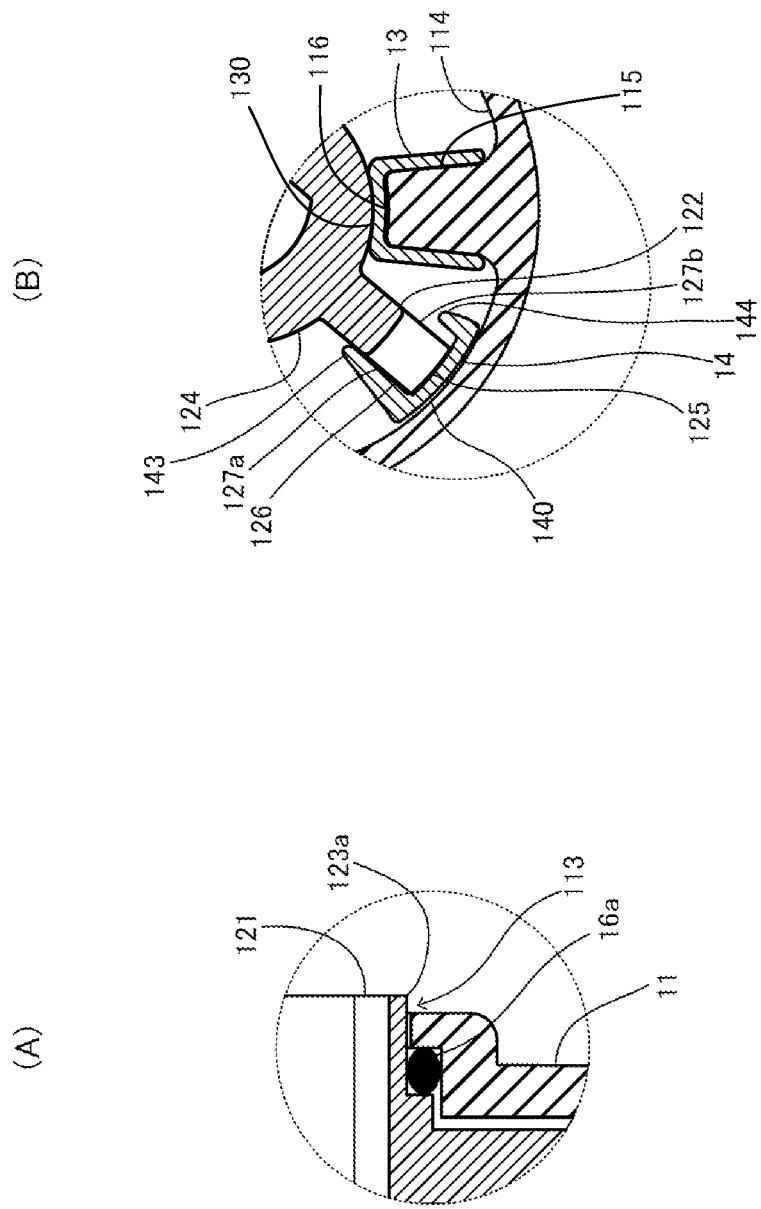
FIG. 4(A) is an enlarged view of the part C of the rotary damper 1 illustrated in FIG. 2(A)
FIG. 4(B) is an enlarged view of the part D illustrated in FIG. 2(B).

FIG. 1(A) to FIG. 1(C) are a front view, a side view, and a back view, of a rotary damper 1 according to one embodiment of the present invention, respectively. FIG. 2(A) is an A-A cross sectional view of the rotary damper 1 illustrated in FIG. 1(A), and FIG. 2(B) is a B-B cross sectional view of the rotary damper 1 illustrated in FIG. 1(B). FIG. 3(A) and FIG. 3(B) are an enlarged view of the part A and an enlarged view of the part B, of the rotary damper 1 illustrated in FIG. 2(A), respectively; FIG. 4(A) is an enlarged view of the part C of the rotary damper 1 illustrated in FIG. 2(A), and FIG. 4(B) is an enlarged view of the part D illustrated in FIG. 2(B).

As illustrated in the figures, a rotary damper 1 according to the present embodiment has the following: a casing 11; a rotor 12 contained in the casing 11 rotatably relative to the casing 11; viscous fluid (not illustrated), such as oil and silicone, filled in the casing 11; a lid 15 keeping the rotor 12 together with the viscous fluid sealed inside the casing 11; and a pair of axial force generation members 17. This rotary damper 1, which is intended as a damper for a brake pedal of an automobile, is capable of generating a large damping torque in relation to a rotation of the casing 11 relative to the rotor 12 in a forward direction N, whereas a small damping torque in relation to a rotation of the casing 11 relative to the rotor 12 in a backward direction R (see FIG. 1(C) and FIG. 2(B)).

Figure 5:
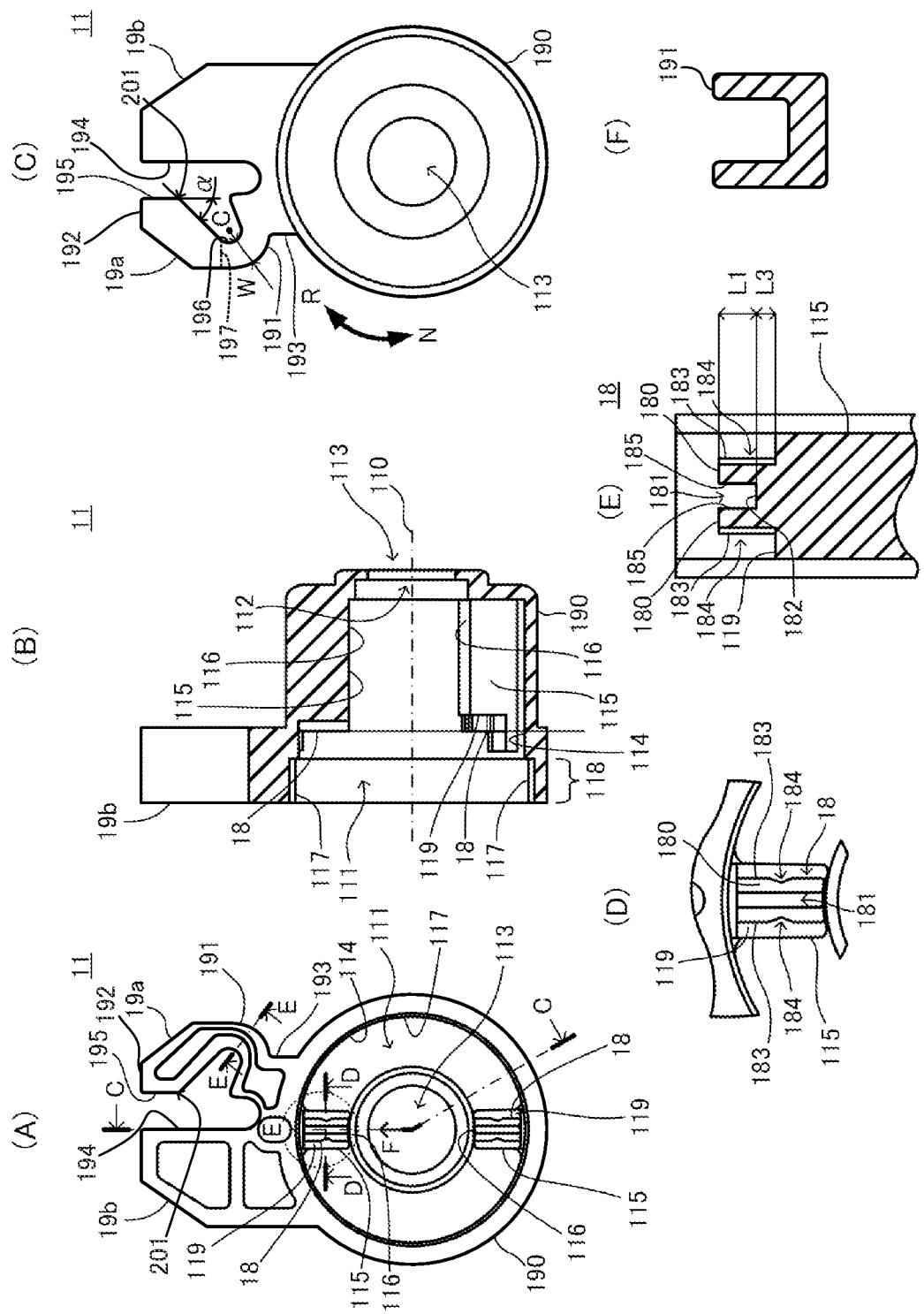
FIG. 5(A) is a front view of a casing 11.
FIG. 5(B) is a C-C cross sectional view of the casing 11 illustrated in FIG. 5(A)
FIG. 5(C) is a back view of the casing 11.
FIG. 5(D) is an enlarged view of the part E of the casing 11 illustrated in FIG. 5(A)
FIG. 5(E) is an enlarged D-D cross-sectional view of the casing 11 illustrated in FIG. 5(A)
FIG. 5(F) is an enlarged E-E cross-sectional view of the casing 11 illustrated in FIG. 5(A).

FIG. 5(A) is a front view of the casing 11, FIG. 5(B) is a C-C cross sectional view of the casing 11 illustrated in FIG. 5(A), FIG. 5(C) is a back view of the casing 11, FIG. 5(D) is an enlarged view of the part E of the casing 11 illustrated in FIG. 5(A), and FIG. 5(E) is an enlarged D-D cross-sectional view of the casing 11 illustrated in FIG. 5(A), and FIG. 5(F) is an enlarged E-E cross-sectional view of the casing 11 illustrated in FIG. 5(A).

Figure 6:
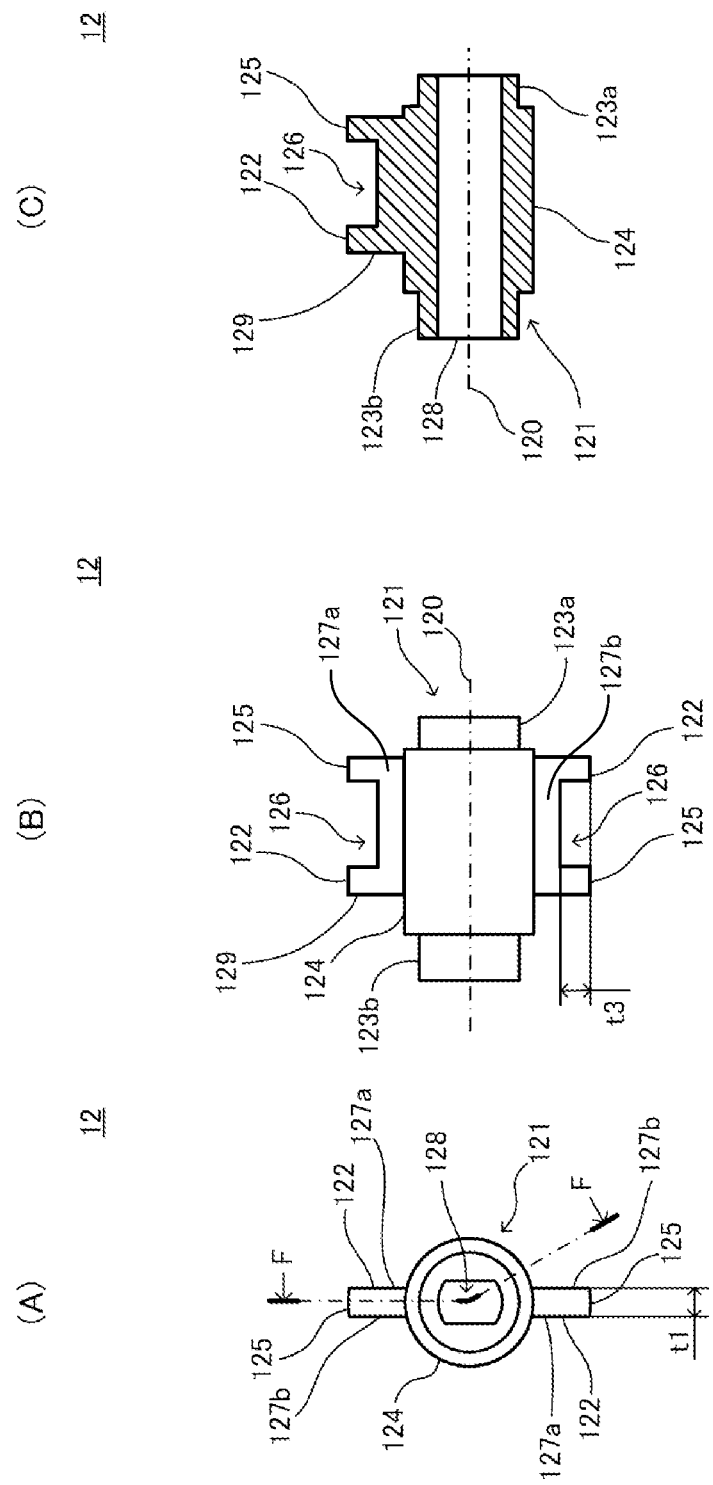
FIG. 6(A) and FIG. 6(B) are a front view and a side view of a rotor 12, respectively.
FIG. 6(C) is an F-F cross sectional view of the rotor 12 illustrated in FIG. 6(A).

As illustrated in the figures, the casing 11, which is made of thermoplastic resin, such as polyacetal, includes a circular cylindrical chamber with one open end (i.e. a space having a circular cylinder shape with a bottom) 111 defined inside and an opening section 113 formed through a bottom 112 of the circular cylindrical chamber 111 so as to allow insertion of the rotor 12. Inserting a lower end portion 123a (See FIG. 6) of below-mentioned rotor body 121 into this opening section 113 places the rotor 12 in the circular cylindrical chamber 111 such that a rotation axis 120 of the rotor 12 is aligned with a center line 110 of the circular cylindrical chamber 111 (See FIG. 2(A)). An sidewall surface 114 within the circular cylindrical chamber 111 has a pair of partitions 115 each formed thereon along the center line 110 of the circular cylindrical chamber 111, and the partitions 115 are axisymmetrically arranged with respect to the center line 110 and projecting radially inward so as to place respective front-end surfaces 116 close to an outer circumferential surface 124 (see FIG. 6) of below-mentioned rotor body 121 of the rotor 12, thereby partitioning an inside of the circular cylindrical chamber 111.

Figure 9:
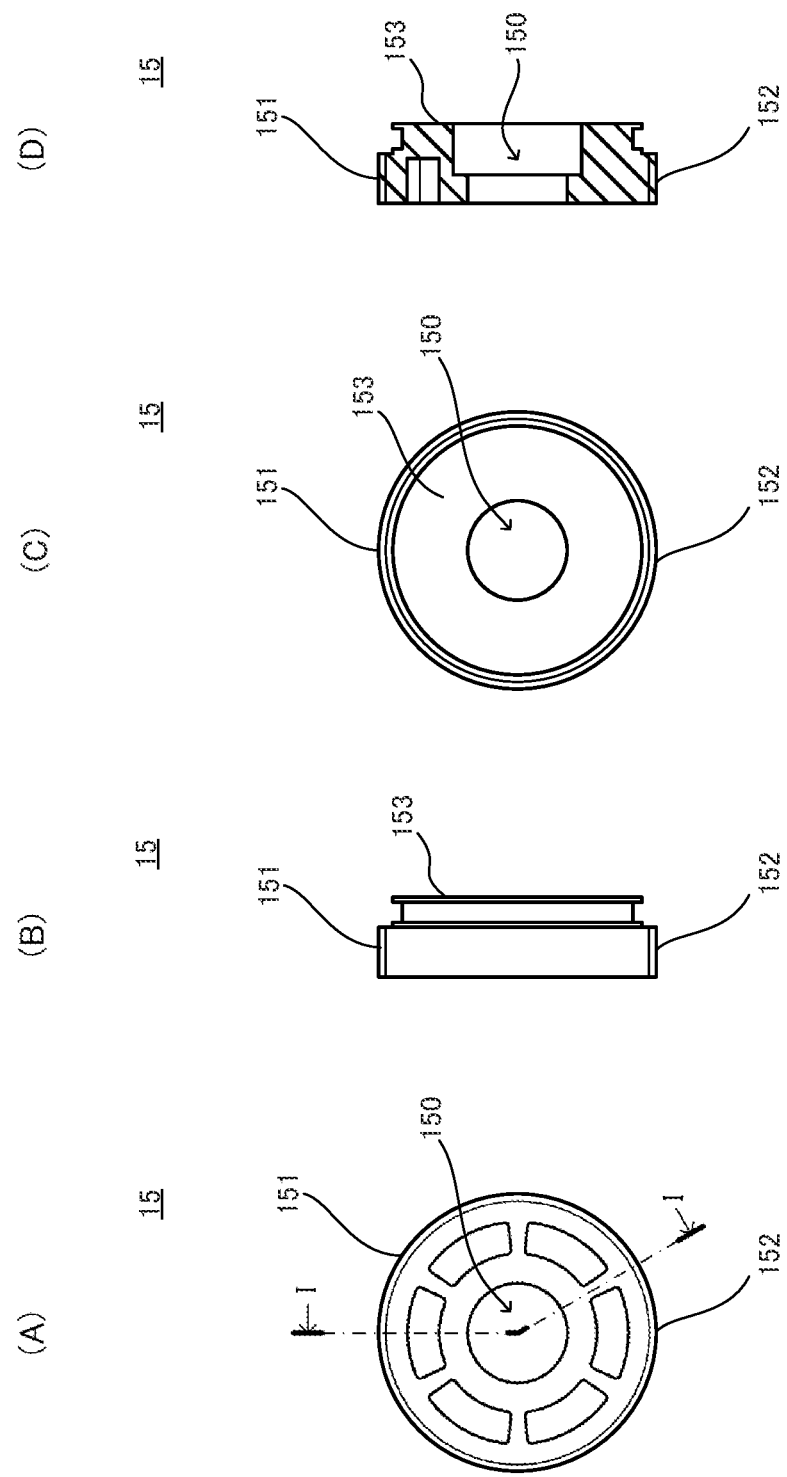
FIG. 9(A) to FIG. 9(C) are a front view, a side view, and a back view of a lid 15, respectively.
FIG. 9(D) is an I-I cross sectional view of the lid 15 illustrated in FIG. 9(A).
Figure 10:
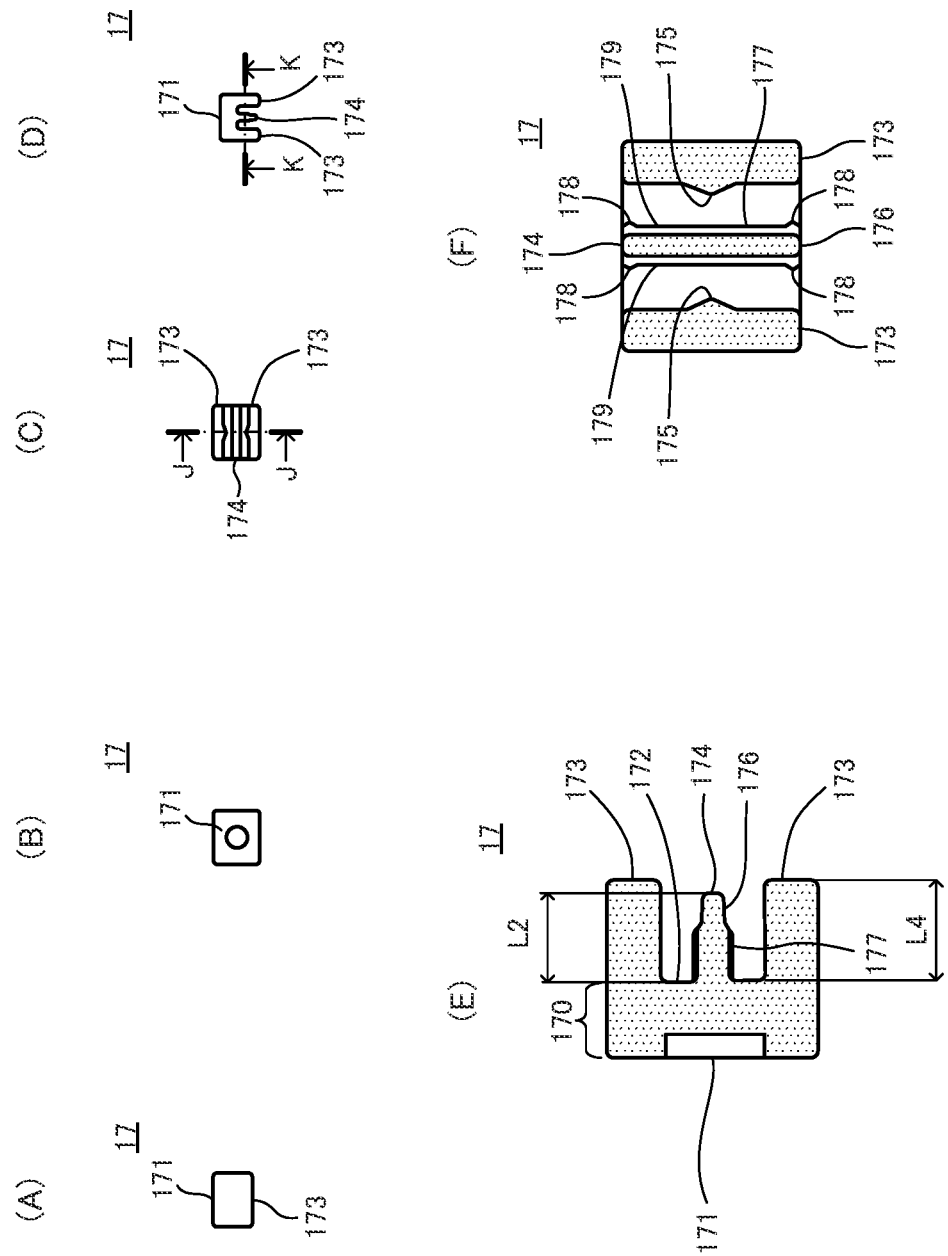
FIG. 10(A) to FIG. 10(D) are a front view, a top view, a bottom view, and a side view, of a axial force generation member 17, respectively.
FIG. 10(E) is an enlarged J-J cross-sectional view of the axial force generation member 17 illustrated in FIG. 10(C)
FIG. 10(F) is an enlarged K-K cross-sectional view of the axial force generation member 17 illustrated in FIG. 10(D).

A below-mentioned first seal member 13 is attached to each of the paired partitions 115 (See FIG. 4(B)). The paired partitions 115 have protrusions 18 formed on respective top surfaces 119 that are facing surfaces to a back face 153 (see FIG. 9) of the lid 15, allowing attachment of each axial force generation member 17 to the corresponding protrusion 18. A top surface 180 of each protrusion 18 has a groove 181 defined thereon along a radial direction of the circular cylindrical chamber 111 so as to allow insertion of a below-mentioned adjustment portion 174 of the corresponding axial force generation member 17 into the groove 181, and a groove bottom 182 of each groove 181 is located closer to the lid 15 than the top surface 119 of the corresponding partition 115 is. Both side surfaces 183 of each protrusion 18, which are arranged along the radial direction of the casing 11, include respective grooves 184 defined along the center line 110 of the circular cylindrical chamber 111, thereby allowing attachment of below-mentioned pushing portions 175 of the corresponding axial force generation member 17 to the grooves 184.

On one side 118 closer to the open end of the circular cylindrical chamber 111, the sidewall surface 114 includes an internal threaded portion 117 to engage with a below-mentioned external threaded portion 152 (see FIG. 9) of the lid 15.

Figure 12:
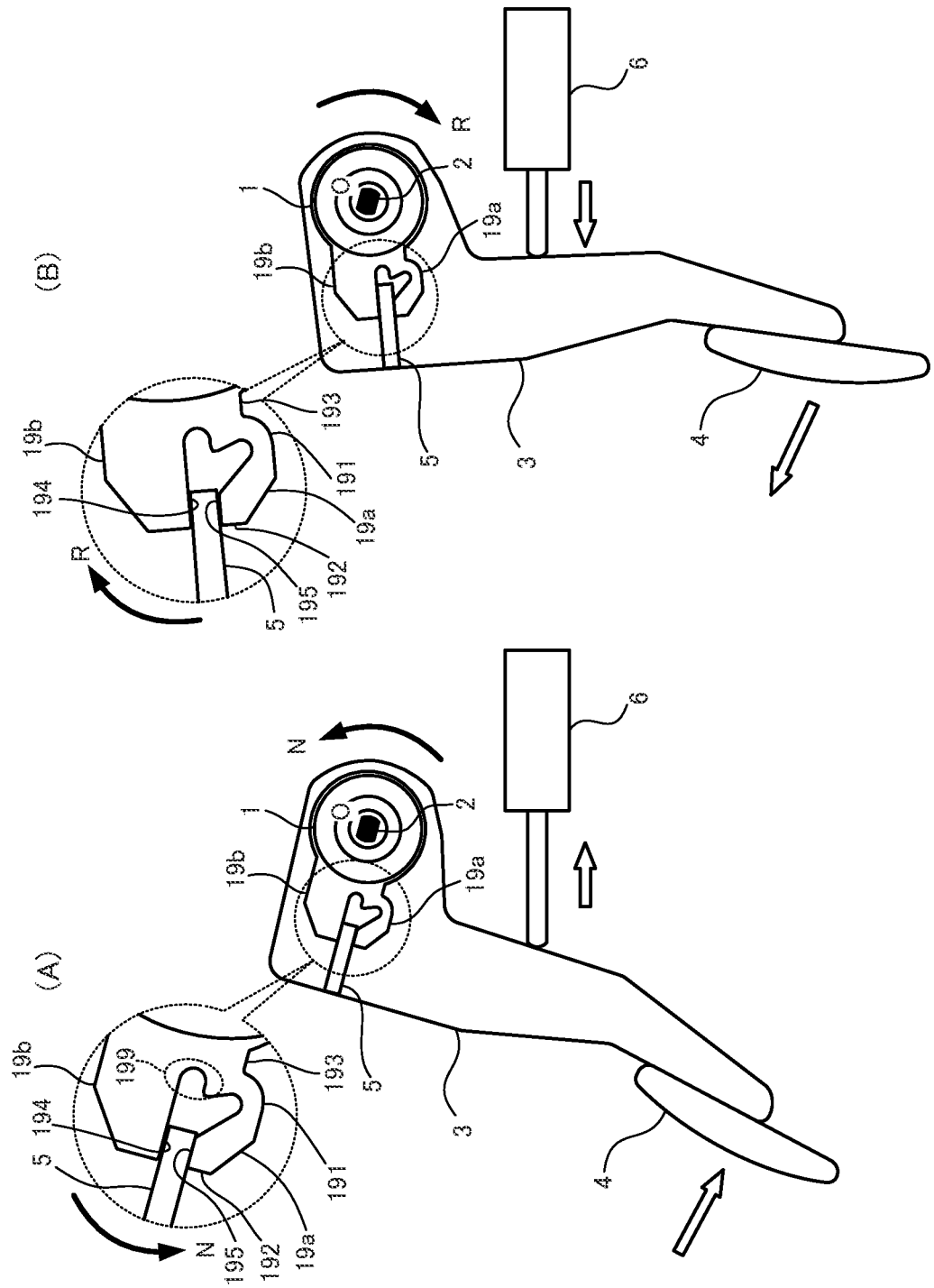
FIG. 12(A) and FIG. 12(B) illustrate an example of an automotive braking system to which the rotary damper 1 according to one embodiment of the present invention is applied.

On the side 118 closer to the open end of the circular cylindrical chamber 111, an outer circumferential surface 190 of the casing 11 includes a pair of arms 19a, 19b projecting radially outward, and a plate 5, which is allowed to rotate about a pedal rotation center O in conjunction with a brake pedal 4 of an automobile, is to be located between the arms 19a, 19b (see FIG. 12).

The arm 19a is located downstream from the arm 19b in the forward direction N (see FIG. 2(B)) which is a rotation direction of the casing 11 relative to the rotor 12 when the large damping torque is generated in the rotary damper 1. The arm 19a has a curved portion 191 to be bent in the rotation direction N, a supporting portion 192, and a connecting portion 193.

The curved portion 191 throughout its entirety has the same shape in every section obtained by cutting radially around a curvature center C of the curved portion 191 (see FIG. 5(F)), and is constant in radial width W from the curvature center C (see FIG. 5(C)).

Figure 13:
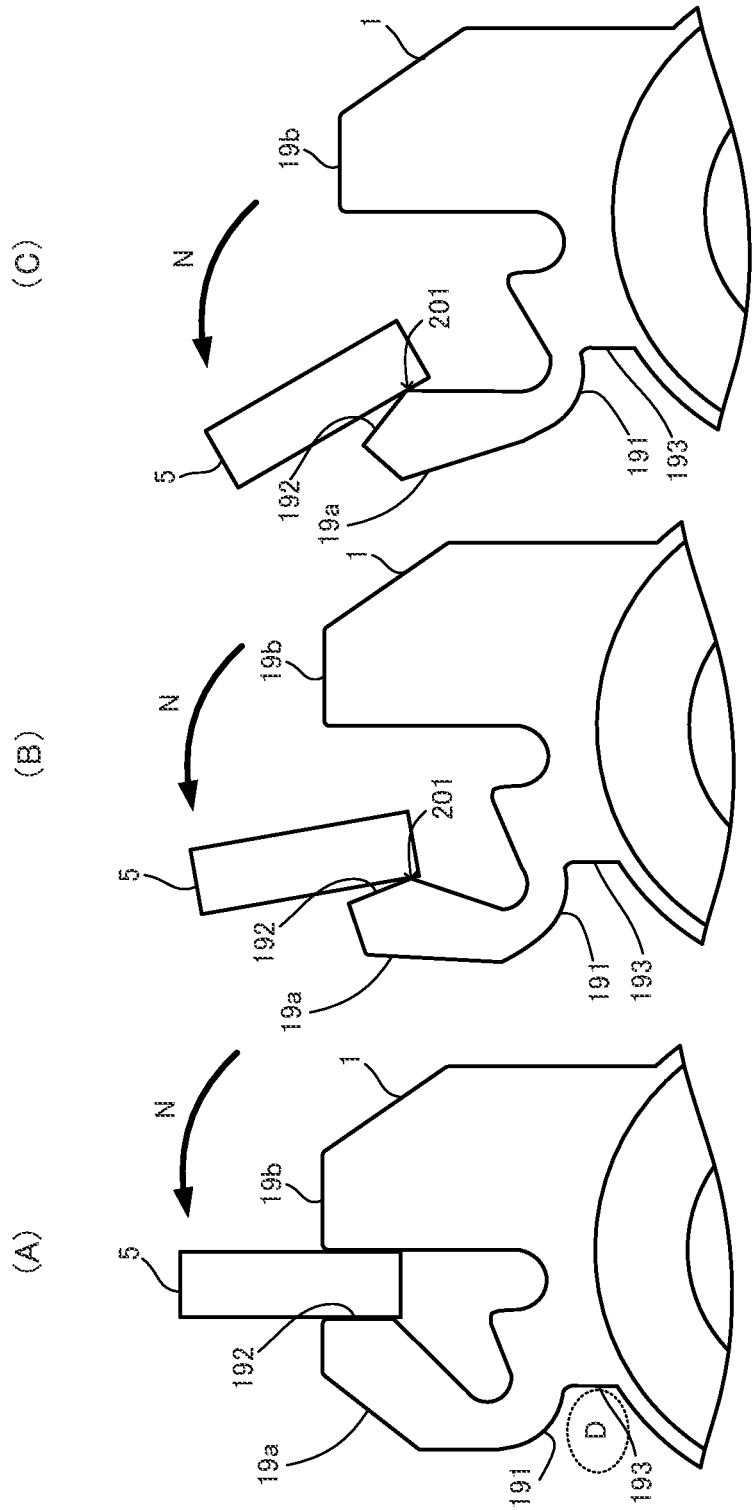
FIG. 13(A) to FIG. 13(C) illustrate the operation in the automotive braking system illustrated in FIG. 12, in the event of a failure in the rotary damper 1.

The supporting portion 192, which is located more distal than the curved portion 191 is and which is designed to support the plate 5 that is allowed to rotate about the pedal rotation center O in conjunction with the brake pedal 4 (see FIG. 12), has a supporting surface 195 to contact with and support the plate 5. Here, an angle α (see FIG. 5(C)) is defined between the supporting surface 195 and a straight line passing through following positons: a position, which is on an inner surface 196 of the curved portion 191 and at an edge 197 of a supporting portion 192 side of the curved portion 191; and a position, which is at an edge 201 of a curved portion 191 side of the supporting surface 195. This angle α may preferably fall within the angular range where the edge 201 of the curved portion 191 side of the supporting surface 195 remains in a line contact with the plate 5 during time when the plate 5 presses and deforms the curved portion 191 (see FIG. 13). However, for the angle α less than 10 degrees, the arm 19a is to be lengthened in order to ensure the contact of the supporting surface 195 with the plate 5, which results in an increase in the size of the rotary damper 1. The angle α more than 90 degrees also leads to the arm 19a being lengthened, resulting in an increase in the size of rotary damper 1. Due to the usual space constraints for installation of the rotary damper 1 on the brake pedal 4, an increased size of the rotary damper 1 may provide difficulties in installing the rotary damper 1 on the brake pedal 4. The angle α may preferably but optionally fall within the range of 30 to 60 degrees.

The connecting portion 193 extends radially outward from the outer circumferential surface 190 of the casing 11 and leads to the curved portion 191.

The arm 19b is located upstream from the arm 19a in the forward direction N (see FIG. 2(B)) which is the rotation direction of the casing 11 relative to the rotor 12 when the large damping torque is generated in the rotary damper 1. The arm 19b has a flat surface 194 extending radially outward from the outer circumferential surface 190 of the casing 11 and facing the arm 19a. The flat surface 194 is designed to support the plate 5 that is allowed to rotate about the pedal rotation center O in the backward direction R in conjunction with the brake pedal 4.

FIG. 6(A) and FIG. 6(B) are a front view and a side view of the rotor 12, respectively; and FIG. 6(C) is an F-F cross sectional view of the rotor 12 illustrated in FIG. 6(A).

The rotor 12, which is made of thermoplastic resin, such as polyamide resin, has a rotor body 121 in cylindrical shape and a pair of vanes (rotating blades) 122 axisymmetrically formed with respect to the rotation axis 120 of the rotor 12, as illustrated in the figure. The vanes 122 are arranged along the rotation axis 120 of the rotor 12 and formed projecting radially outward from the outer circumferential surface 124 of the rotor body 121 so as to place respective front-end surfaces 125 close to the sidewall surface 114 within the circular cylindrical chamber 111 in the casing 11, thereby partitioning the inside of the circular cylindrical chamber 111. Each vane 122 has a flow passage 126 passing through both side surfaces 127a, 127b of the vane 122 along rotation directions of the casing 11. A below-mentioned second seal member 14 is attached to each of the paired vanes 122 (see FIG. 4(B)).

The rotor body 121 includes a through hole 128 with a center at the rotation axis 120 of the rotor 2, an inside surface of which has two opposite flats and into which a shaft (not illustrated) with two opposite flat sides is to be inserted so as to transmit an external rotative force to the rotor 12. The lower end portion 123a of the rotor body 121 is rotatably inserted in the opening section 113 formed through the bottom 112 of the circular cylindrical chamber 111 in the casing 11 (see FIG. 4(A)), and an upper end portion 123b of the rotor body 121 is rotatably inserted in a below-mentioned opening section 150 (see FIG. 9) through the lid 15 (see FIGS. 3(A), (B)).

In order to prevent external-leakage of the viscous fluid through the opening section 113 of the circular cylindrical chamber 111, a seal member, such as an O-ring 16a, may be interposed between the lower end portion 123a of the rotor body 121 and the opening section 113 of the circular cylindrical chamber 111 (see FIG. 4(A)).

FIG. 7(A) and FIG. 7(B) are a front view and a side view of a first seal member 13, respectively; and FIG. 7(C) is a G-G cross sectional view of the first seal member 13 illustrated in FIG. 7(A).

As illustrated in the figures, each of first seal members 13 has a U-shape to allow attachment to any one of the partitions 115 formed in the circular cylindrical chamber 111 in the casing 11 and interposes its bottom 130 between the front-end surface 116 of the corresponding partition 115 and the outer circumferential surface 124 of the rotor body 121 of the rotor 12, thereby filling a clearance gap between these surfaces 116, 124 (see FIG. 4(B)). Each of the first seal members 13 is located between the casing 11 and the rotor 12 that are to rotate relatively, and thus resin excellent in sliding properties, such as polyamide, may be used as a preferable but optional material thereof.

Figure 8:
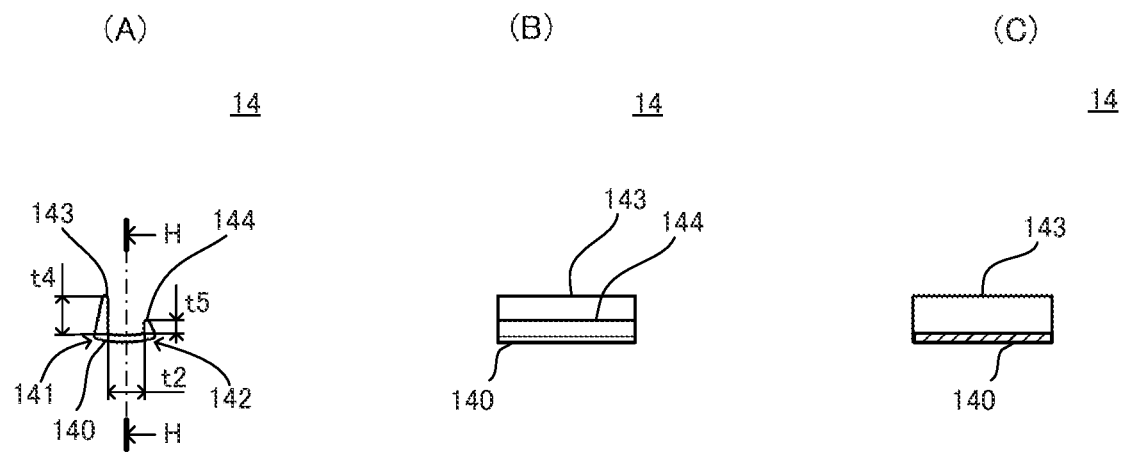
FIG. 8(A) and FIG. 8(B) are a front view and a side view of a second seal member 14, respectively.
FIG. 8(C) is an H-H cross sectional view of the second seal member 14 illustrated in FIG. 8(A).

FIG. 8(A) and FIG. 8(B) are a front view and a side view of a second seal member 14, respectively; and FIG. 8(C) is an H-H cross sectional view of the second seal member 14 illustrated in FIG. 8(A).

As illustrated in the figures, each of second seal members 14 has a U-shape to allow attachment to any one of the vanes 122 of the rotor 12 and includes the following portions: a bottom 140 having a width t2 lager than a width t1 of the corresponding vane 122 in the rotation directions (see FIG. 6(A)); a first leg 143 integrally formed at one edge 141 of the bottom 140 and having a width t4 lager than a radial width t3 of the flow passage 126 defined in the corresponding vane 122 (see FIG. 6(B)); and a second leg 144 integrally formed at another edge 142 of the bottom 140 and having a width t5 smaller than the radial width t3 of the flow passage 126 defined in the corresponding vane 122.

Each second seal member 14 attached to the corresponding vane 122 interposes its bottom 140 between the front-end surface 125 of the corresponding vane 122 and the sidewall surface 114 within the circular cylindrical chamber 111 in the casing 11, thereby filling a clearance gap between these surfaces 125, 114 (see FIG. 4(B)). As illustrated in FIG. 2(B), when the casing 11 rotates in the forward direction N relative to the rotor 12, pressure of the viscous fluid begins to increase in sections 111a (see FIG. 2(B)) each separated by the corresponding partition 115 and the corresponding vane 122 located downstream in the forward direction N relative to the corresponding partition 115, which causes the second seal members 14 to move in the forward direction N; this causes the first leg 143 of each second seal member 14 to abut one side surface 127a of the corresponding vane 122, thereby closing the flow passage 126 defined in the corresponding vane 122.

Conversely, when the casing 11 rotates in the backward direction R relative to the rotor 12, pressure of the viscous fluid begins to increase in sections 111b (see FIG. 2(B)) each separated by the corresponding partition 115 and the corresponding vane 122 located downstream in the backward direction R relative to the corresponding partition 115, which causes the second seal members 14 to move in the backward direction R; this causes the second leg 144 of each to abut another side surface 127b of the corresponding vane 122, thereby opening the flow passage 126 defined in the corresponding vane 122. The second seal members 14 are located between the casing 11 and the rotor 12 that are relatively rotatable, and thus resin excellent in sliding properties, such as polyamide, may be used as a preferable but optional material thereof.

FIG. 9(A) to FIG. 9(C) are a front view, a side view, and a back view, of the lid 15, respectively; and FIG. 9(D) is an I-I cross sectional view of the lid 15 illustrated in FIG. 9(A).

As illustrated in the figures, the lid 15 includes an opening section 150 that is formed at and through a place facing the opening section 113 in the bottom 112 of the circular cylindrical chamber 111 in the casing 11 and that allows insertion of the upper end portion 123b of the rotor body 121 of the rotor 12. The lid 15 has an external threaded portion 152 on an outer circumferential surface 151 thereof, which allows engagement with the internal threaded portion 117 formed on the opening side 118 of the sidewall surface 114 within the circular cylindrical chamber 111. The undersurface (the back face) 153 of the lid 15 and a top surface 129 of each vane 122 of the rotor 12 define a clearance gap G1 therebetween (see FIG. 3(B)), and each clearance gap G1 is to act as a flow passage for the viscous fluid filled in the circular cylindrical chamber 111. These clearance gaps G1, which each is to act as the flow passage for the viscous fluid, are adjustable through adjusting a screwing amount of the lid 15 into the casing 11 (an amount of engagement between the external threaded portion 152 of the lid 15 and the internal threaded portion 117 of the casing 11).

In order to prevent external-leakage of the viscous fluid through the opening section 150 of the lid 15, a seal member, such as an O-ring 16b, may be interposed between the upper end portion 123b of the rotor body 121 of the rotor 12 and the opening section 150 of the lid 15. Similarly, in order to prevent external-leakage of the viscous fluid through a threaded interface between the external threaded portion 152 of the lid 15 and the internal threaded portion 117 of the circular cylindrical chamber 111 in the casing 11, a seal member, such as an O-ring 16c, may be interposed between the outer circumferential surface 151 of the lid 15 and the sidewall surface 114 within the circular cylindrical chamber 111 (see FIG. 3(A) and FIG. 3(B)).

Figure 11:
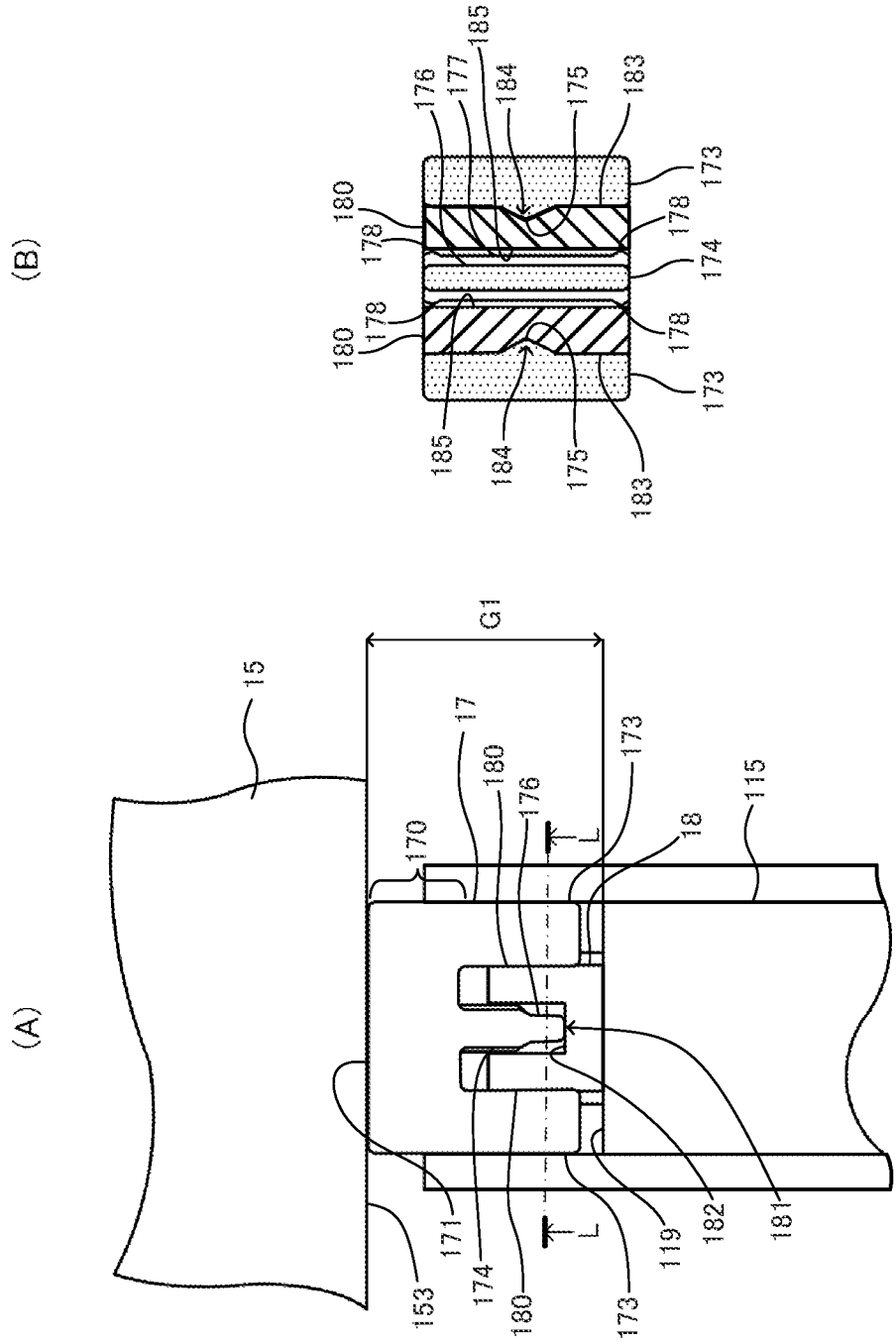
FIG. 11(A) is an enlarged view of the axial force generation member 17 as seen from a center of the rotary damper 1 according to one embodiment of the present invention, in which the axial force generation member 17 is attached to a protrusion 18 of a partition 115 of the casing 11.
FIG. 11(B) is an enlarged L-L cross-sectional view of the axial force generation member 17 illustrated in FIG. 11(A).

FIG. 10(A) to FIG. 10(D) are a front view, a top view, a bottom view, and a side view, of the axial force generation member 17, respectively; FIG. 10(E) is an enlarged J-J cross-sectional view of the axial force generation member 17 illustrated in FIG. 10(C); and FIG. 10(F) is an enlarged K-K cross-sectional view of the axial force generation member 17 illustrated in FIG. 10(D). FIG. 11(A) is an enlarged view of the axial force generation member 17 as seen from a center of the rotary damper 1 according to the present embodiment (which corresponds to a view as seen from an arrow direction F in FIG. 5(A)), in which the axial force generation member 17 is attached to the protrusion 18 of the partition 115 of the casing 11, and FIG. 11(B) is an enlarged L-L cross-sectional view of the axial force generation member 17 illustrated in FIG. 11(A).

Each of the axial force generation members 17 is made of plastically deformable material, including thermoplastic resin, such as polyacetal, and sintered metal, or elastically deformable material, including natural rubber, synthetic rubber, and synthetic resin elastomer; and is attached to the protrusion 18 on the top surface 119 of the corresponding one of the paired partitions 115 of the casing 11 and is interposed between the top surface 119 of the corresponding partition 115 and the back face 153 of the lid 15, thereby filling a clearance gap between the back face 153 of the lid 15 and the top surface 119 of the corresponding partition 115 and allowing an axial force to be generated by screwing the lid 15 into the casing 11.

As illustrated in the figures, the axial force generation members 17 each include a body 170 in rectangular shape having a top surface 171 to come into contact with the back face 153 of the lid 15; a pair of arms 173 formed on an undersurface 172 of the body 170 to pinch the both side surfaces 183 of the protrusion 18 formed on the top surface 119 of the corresponding partition 115 of the casing 11 and to grasp the protrusion 18; and an adjustment portion 174 located between the paired arms 173 and projecting toward the corresponding protrusion 18 so as to be inserted in the groove 181 of the corresponding protrusion 18.

The paired arms 173 have respective first pushing portions 175 to be push into and contact with the grooves 184 defined in the both side surfaces 183 of the corresponding protrusion 18. When the axial force generation member 17 is attached to the corresponding protrusion 18, the first pushing portions 175, together with the grooves 184 in the both side surfaces 183 of the corresponding protrusion 18, act to ensure positioning. Moreover, owing to the first pushing portions 175, the paired arms 173 can grip the protrusion 18 firmly so as not to allow the axial force generation member 17 to drop from the protrusion 18. The paired arms 173 each have a length L4 (<L2+L3) less than a sum of a length L2 of the adjustment portion 174 and a length L3 (see FIG. 5(E)) from the top surface 119 of the partition 115 to the groove bottom 182 in the groove 181 of the protrusion 18 formed on the top surface 119.

The adjustment portion 174 has the length L2 (>L) longer than a depth L1 (see FIG. 5(E)) of the groove 181 of the protrusion 18 formed on the top surface 119 of the partition 115, and its distal end 176 is narrower than its base portion 177 in width of thickness direction. Here, the groove 181 of the protrusion 18 has such a size that plastic or elastic deformation can be caused in the distal end 176 of the adjustment portion 174. The base portion 177 of the adjustment portion 174 has, on both sides 179 thereof in thickness direction, second pushing portions 178 to contact with and push against both sidewalls 185 inside the groove 18 of the protrusion 18. These second pushing portions 178 enable the adjustment portion 174 to have fit in the groove 181 of the protrusion 18, thus more reliably preventing the axial force generation member 17 from dropping from the corresponding protrusion 18.

Since the paired arms 173 each have the length L4 less than the sum of the length L2 of the adjustment portion 174 and the length L3 form the top surface 119 of the partition 115 to the groove bottom 182 in the groove 181 of the protrusion 18 and the adjustment portion 174 has the length L2 longer than the depth L1 of the groove 181 of the protrusion 18, the distal end 176 of the adjustment portion 174 can come into contact with the groove bottom 182 in the groove 181 of the protrusion 18 without contact between the paired arms 173 and the top surface 119 of the partition 115. Since the groove 181 of the protrusion 18 has such a size that plastic or elastic deformation can be caused in the distal end 176 of the adjustment portion 174, the screwing of the lid 15 into the casing 11 can, while causing the axial force, cause plastic or elastic deformation not only in the body 170 but also concentratedly in the distal end 176 of the adjustment portion 174 thus allowing an increasing leeway for adjustment of the clearance gap G1 between the back face 153 of the lid 15 and the top surface 129 of each vane 122.

For the rotary damper 1 with above structures, when the casing 11 rotates in the forward direction N relative to the rotor 12 (see FIG. 2(B)), the second seal members 14 move in the forward direction N and the first leg 143 of each of the second seal members 14 abuts one side surface 127a of the corresponding vane 122, thereby closing the flow passage 126 defined in the corresponding vane 122. At this moment, each of the first seal members 13 attached to the partitions 115 in the circular cylindrical chamber 111 in the casing 11 is closing the clearance gap between the front-end surface 116 of the corresponding partition 115 and the outer circumferential surface 124 of the rotor body 121 of the rotor 12, and each of the second seal members 14 attached to the vanes 122 of the rotor 12 is closing the clearance gap between the front-end surface 125 of the corresponding vane 122 and the sidewall surface 114 of the circular cylindrical chamber 111 in the casing 11 (see FIG. 4(B)). Accordingly, the movement of the viscous fluid filled in the circular cylindrical chamber 111 is only allowed via the clearance gap G1 between the back face 153 of the lid 15 and the top surface 129 of each of the vanes 122, which leads to an increase in pressure of the viscous fluid in the sections 111a (See FIG. 2(B)) each separated by the corresponding partition 115 and the corresponding vane 122 located downstream in the forward direction N relative to the corresponding partition 115. This results in occurrence of the large damping torque.

Here, the clearance gap G1 between the back face 153 of the lid 15 and the top surface 129 of each vane 122 is adjustable though adjusting a screwing amount of the lid 15 into the casing 11 (an amount of engagement between the external threaded portion 152 of the lid 15 and the internal threaded portion 117 of the casing 11). Therefore, it is possible to adjust an amount of movement of the viscous fluid via the clearance gaps G1 to control the damping torque to be caused by applied rotation.

Moreover, between the back face 153 of the lid 15 and the top surface 119 of each partition 115, the corresponding axial force generation member 17 is located so as to apply a reaction force to the lid 15; thus, screwing the lid 15 into the casing 11 causes the axial force generation members 17 to generate the axial force, thereby preventing external-leakage of the viscous fluid through the threaded interface between the external threaded portion 152 of the lid 15 and the internal threaded portion 117 of the casing 11, and also allows an increasing leeway for adjustment of the clearance gap G1, resulting in a wider adjustment range of the damping torque.

Conversely, when the casing 11 rotates in the backward direction R relative to the rotor 12 (see FIG. 2(B)), each second seal members 14 moves in the backward direction R and then its second leg 144 abuts another side surface 127b of the corresponding vane 122, thereby opening the flow passage 126 defined in the corresponding vane 122. Accordingly, the viscous fluid filled in the circular cylindrical chamber 111 is allowed to move not only via the clearance gap G1 between the back face 153 of the lid 15 and the top surface 129 of each vane 122 but also via the flow passage 126 defined in each vane 122, which leads to little increase in pressure of the viscous fluid in the sections 111b (see FIG. 2(B)) each separated by the corresponding partition 115 and the corresponding vane 122 located in the backward direction R relative to the corresponding partition 115. This results in occurrence of the small damping torque.

FIG. 12(A) and FIG. 12(B) illustrate one example of an automotive braking system to which the rotary damper 1 according to the present embodiment is applied.

A braking system has a shaft 2 located at the pedal rotation center O; a brake arm 3 rotatably mounted on the shaft 2 and linked to a brake master cylinder 6; a brake pedal 4 mounted on one end of the brake arm 3; the plate 5 mounted on the brake arm 3 to rotate about the pedal rotation center O together with the brake pedal 4; and the rotary damper 1 mounted on the shaft 2 with the plate 5 interposed between the paired arms 19a, 19b.

Here, the shaft 2 has an end with the two opposite flat sides, and the end is inserted into the through hole 128, the inside surface of which has the two opposite flats, of the rotor 12 of the rotary damper 1, thereby fixing the rotor 12 to the shaft 2 and constraining rotation of the rotor 12 about the pedal rotation center O. The rotary damper 1 is mounted in such a manner that when the brake pedal 4 is depressed and the plate 5 rotates about the pedal rotation center O in the forward direction N, the supporting surface 195 of the supporting portion 192 of the arm 19a supports the plate 5, and that when the brake pedal 4 is released and the plate 5 rotates about the pedal rotation center O in the backward direction R, the flat surface 194 of the arm 19b supports the plate 5. The plate 5 is located between the supporting surface 195 of the supporting portion 192 of the arm 19a and the flat surface 194 of the arm 19b and grasped by the paired arms 19a, 19b, without interfering with a base portion 199 between the paired arms 19a, 19b (see FIG. 12(A)).

For the braking system with the above structures, when the brake pedal 4 is depressed as illustrated in FIG. 12(A), the inside of the brake master cylinder 6 is compressed and the plate 5 rotates in the forward direction N about the pedal rotation center O the rotation torque around which is transmitted through the arm 19a to the casing 11 of the rotary damper 1. Here, since rotation of the rotor 12 about the pedal rotation center O has been constrained, the casing 11 rotates relative to the rotor 12 in the forward direction N and the rotary damper 1 generates the large damping torque. This generates a strong reaction force with reaction to a push of the brake pedal 4, providing good brake feel.

By the way, in FIG. 12(A), when the rotation torque in the forward direction N is transmitted from the plate 5 to the arm 19a, stress occurs in the arm 19a and such stress tends to be is concentrated at the curved portion 191 of the arm 19a. Therefore, in case of such a failure in the rotary damper 1 that the casing 11 is prevented from rotating in the forward direction N relative to the rotor 12, hard depressing the brake pedal 4 can force the curved portion 191 to be deformed to 13(C) or to be even broken in some situations, as illustrated in FIG. 13(A), thereby releasing the plate 5 from support by the arm 19a; this enables compression of the inside of the brake master cylinder 6, so that the brake is activated. During this time, the curved portion 191 deforms toward a space D (see FIG. 13(A)) kept between the curved portion 191 and the casing 11 by the connecting portion 193, and therefore the curved portion 191 can deform without interfering with the brake pedal 4. The curved portion 191, if broken, doesn't prevent the movement of the brake pedal 4.

As illustrated in FIG. 12(B), when the brake pedal 4 is released, the inside of the brake master cylinder 6 is expanded, and the plate 5 rotates in the backward direction R about the pedal rotation center O, the rotation torque around which is transmitted through the arm 19b to the casing 11 of the rotary damper 1. Here, since rotation of the rotor 12 of the rotary damper 1 about the pedal rotation center O has been constrained, the casing 11 rotates in the backward direction R relative to the rotor 12; the resulting damping torque in this situation is the small damping torque, and thus the force to tend to expand the inside of the brake master cylinder 6 overcomes such small damping torque and causes the brake pedal 4 to return to its initial position before being depressed.

Figure 14:
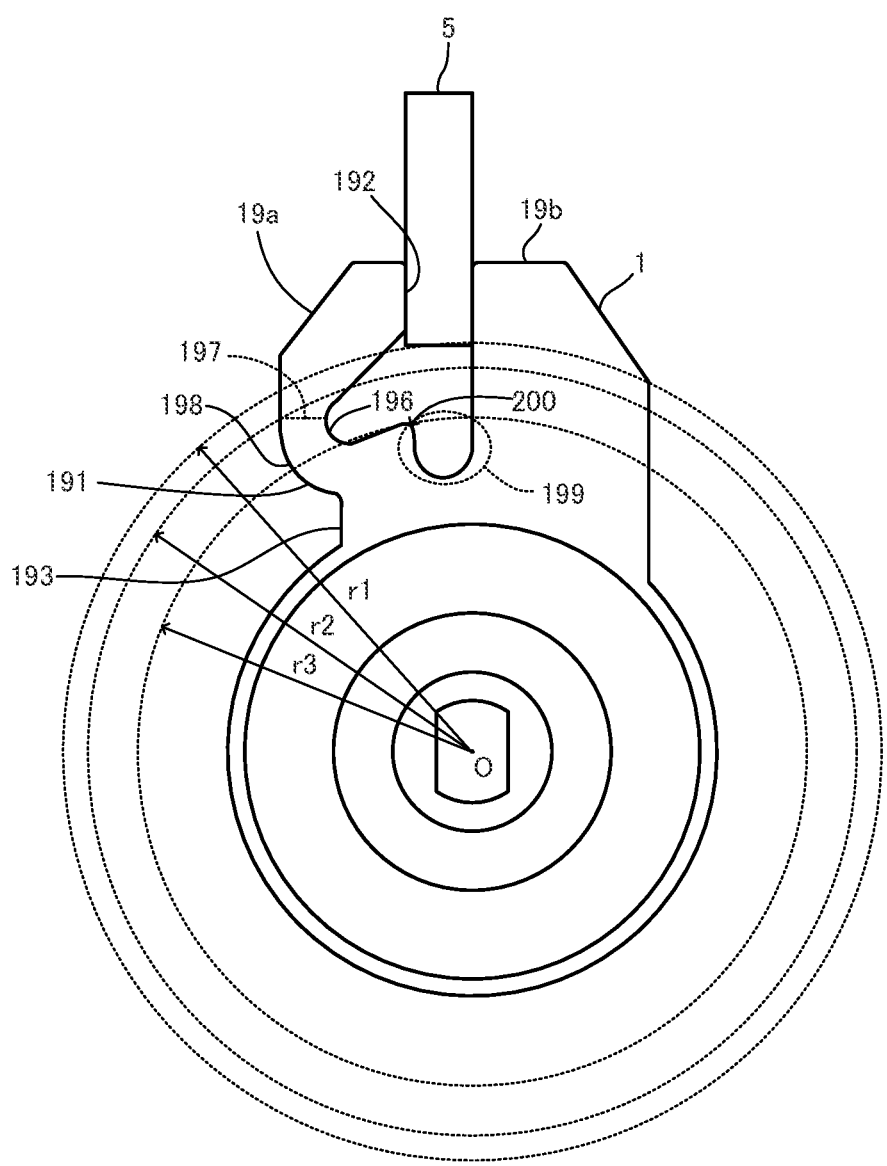
FIG. 14 is an explanatory diagram of positional relation between the rotary damper 1 and a plate 5 of a brake pedal 4.

As illustrated in FIG. 14, given r1 be a distance from the center (the pedal rotation center) O of the rotary damper 1 to the plate 5; r2 be a distance from the center O of the rotary damper 1 to a position which is on an outer surface 198 and at the edge 197 of the supporting portion 192 side of the curved portion 191; and r3 be a distance from the center O of the rotary damper 1 to an outermost portion 200 of the base portion 199 between the paired arms 19a, 19b (the outermost of the connecting portion 193), then the following inequalities may both hold preferably but optionally: r1>r2 and r1>r3. If r1≤r2, then the arm 19a is lengthened, resulting in an increase in the size of the rotary damper 1. Due to the usual space constraints for installation of the rotary damper 1 on the brake pedal 4, an increased size of the rotary damper 1 may provide difficulties in installing the rotary damper 1 on the brake pedal 4. If r1≤r3, then the plate 5 contacts not only to the supporting surface 195 but also to the base portion 199; therefore, during time when the arm 19a is push by the plate 5, the stress arising in the arm 19a by the applied force becomes less concentrated at the curved portion 191.

One embodiment according to the present invention has been hereinabove described.

According to the present embodiment, the rotary damper 1 is installed in such an arrangement that the plate 5 can push the arm 19a located downstream in the forward direction N in relation with a push of the brake pedal 4, and this enables the rotary damper 1 to generate the large damping torque in response to the push of the brake pedal 4

The casing 11 is made of thermoplastic resin, and one arm 19a out of the paired the arms 19a, 19b, which is located downstream in the forward direction N, is provided with the curved portion 191 and supports the plate 5 rotating in the forward direction N, by the supporting portion 192 located at the more distal side of the arm 19a than the curved portion 191; thus, when the arm 19a is subject to the rotation torque in the forward direction N transmitted from the plate 5, the resulting stress arising in the arm 19a is concentrated at the curved portion 191. Therefore, even in case of a failure in the rotary damper 1 and of a resultant loss of rotation of the casing 11 relative to the rotor 12 in the forward direction N, hard depressing the brake pedal 4 breaks the curved portion 191 to releases the plate 5 from support by the arm 19a, and compression of the inside of the brake master cylinder 6 is thereby enabled, so that the brake is activated.

Additionally, the curved portion 191 throughout its entirety has the same shape in every section obtained by cutting radially around the curvature center C of the curved portion 191 (see FIG. 5(F)), and has the constant radial width W from the curvature center C (see FIG. 5(C)); therefore resulting in less variation in the amount of the pedaling force on the brake pedal required to break the curved portion 191, which would be caused by variation in the pushing direction of the plate 5 against the supporting portion 192

Consequently, the present embodiment successfully provides the rotary damper suitable for use as a damper for brake pedal with a fail-safe feature.

In the present embodiment, the arm 19a includes the connecting portion 193 projecting radially outward from the outer circumferential surface 190 of the casing 11 and connecting to the curved portion 191. The connecting portion 193 provides enough a space for the curved portion 191 to bend in the forward direction N. Therefore, in case of a failure of the rotary damper 1 and of a resultant loss of the rotation of the casing 11 relative to the rotor 12 in the forward direction N, less-uncomfortable brake feel is provided because hard depressing the brake pedal 4 causes the brake pedal 4 to be moved in the forward direction N while causing the curved portion 191 to be bent in the forward direction N.

According to the present embodiment, in the rotary damper, which is configured to limit movement of the viscous fluid filled therein, thereby generating the damping torque in response to the applied rotative force, the lid 15 is of the screw-on type capable of being screwed into the casing 11 and the clearance gap G1 between the back face 153 of the lid 15 and the top surface 129 of each vane 122 is adjustable by adjustment of the screwing amount of the lid 15 into the casing 11. Therefore, without increasing component count, a simple structure and an easy operation provide an adjustment of an amount of the viscous fluid to move through the clearance gap G1, thereby controlling the damping torque to be caused by applied rotation.

Additionally, according to the present embodiment, between the back face 153 of the lid 15 and the top surface 119 of the partition 115, the axial force generation member 17 including plastically or elastically deformable element is located so as to apply the reaction force to the lid 15; screwing the lid 15 into the casing 11 causes the axial force generation member 17 to generate the axial force, thereby preventing external-leakage of the viscous fluid through the threaded interface between the external threaded portion 152 of the lid 15 and the internal threaded portion 117 of the casing 11, and also allows an increasing leeway for adjustment of the clearance gap G1, thereby resulting in a wider adjustment range of the damping torque.

In the present embodiment, the top surfaces 119 of the partition 115s are each provided with the protrusion 18 and the axial force generation members 17 are each provided with the paired arms 173 to pinch and grasp the corresponding protrusion 18. This facilities attachment of each axial force generation member 17 to the corresponding partition 115.

In the present embodiment, the axial force generation members 17 are each provided with the adjustment portion 174 located between the paired arms 173, the adjustment portion 174 is formed projecting toward the protrusion 18 on the top surface 119 of the corresponding partition 115 so as to be inserted in the groove 181 of the protrusion 18 to abut the groove bottom 182 in the groove 181, and the groove 181 of the protrusion 18 is designed to have such a size that plastic or elastic deformation can be caused in the distal end 176 of the adjustment portion 174. Thus, screwing the lid 15 into the casing 11 causes the distal end 176 of the adjustment portion 174 to be push against the groove bottom 182 in the groove 181 and to concentratedly undergo plastic or elastic deformation. This allows the leeway for adjustment of the clearance gap G1 to become larger.

In the present embodiment, the paired arms 173 of the axial force generation member 17 each have the first pushing portions 175 to be push into and contact with the grooves 184 defined in the both side surfaces 183 of the protrusion 18 on the top surface 119 of the partition 11. Owing to these first pushing portions 175, the paired arms 173 can grip the protrusions 18 firmly so as not to drop the axial force generation member 17 from the protrusion 18. Moreover, when the axial force generation member 17 is attached to the corresponding protrusion 18, the first pushing portions 175, together with the grooves 184 defined in the both side surfaces 183 of the corresponding protrusion 18, act to ensure positioning; this allows the axial force generation member 17 to be appropriately attached to the protrusion 18.

In the present embodiment, the adjustment portion 174 of the axial force generation member 17 has, on the both sides 179 of its base portion 177, the second pushing portions 178 to contact with and push against the both sidewalls 185 inside the groove 181 of the protrusion 18. These second pushing portions 178 enable the adjustment portion 174 to have fit within the groove 181 of the protrusion 18, thereby more reliably preventing the axial force generation member 17 from dropping from the corresponding protrusion 18.

Moreover, according to the present embodiment, resin excellent in sliding properties, such as polyamide, is used for the first seal member 13 and the second seal member 14 and therefore the first seal member 13 and the second seal member 14 act as slide bearings each providing a slidable support for the outer circumferential surface 124 of the rotor body 121 of the rotor 12. This allows backlash which would be caused, for example, due to misalignment of the shaft 2 for transmitting the external rotative force to the rotor 12 to be absorbed and allows the shaft 2 to rotate smoothly.

The present invention can include, but is not limited to, the above embodiment: it will be obvious to those skilled in the art that various changes may be made without departing from the scope of the invention.

For example, the above embodiment has been described by way of example, in which the clearance gap G1 between the back face 153 of the lid 15 and the top surface 129 of each vane 122 is utilized as flow passage other than the flow passage 126 defined in each vane 122. However, the present invention is not limited to this aspect. The axial force generation member 17 may be arranged so as not to close the clearance gap G1 between the back face 153 of the lid 15 and the top surface 119 of the corresponding vane 12, and thereby not only the clearance gap G1 between the back face 153 of the lid 15 and the top surface 129 of each vane 122 but also the clearance gap between the back face 153 of the lid 15 and the top surface 119 of each partition 115 can be utilized as flow passage for the viscous fluid in addition to the flow passage 126 defined in each vane 122.

The present embodiment has been described herein by way of an example, in which the circular cylindrical chamber 111 has a pair of the partitions 115 and the rotor 12 has a pair of the vanes 122. However, the present invention is not limited to this aspect. As long as the partition (s) 115 in the circular cylindrical chamber 111 and the vane (s) 122 on the rotor 12 are resultantly the same in number, the number of the partition (s) 115 to be formed and the number of the vane (s) 122 to be formed, each may be one, or three or more.

In the present embodiment, each of the second seal members 14 attached to the vanes 122 functions as a check valve for opening and closing the flow passage 126 formed in the corresponding vane 122, but the present invention is not to the aspect. Check valves may be each installed separately from the second seal member 14 so that it can close the flow passage 126 in the corresponding vane 122 when the casing 11 rotates in the forward direction N relative to the rotor 12 and open the flow passage 126 in the vane 122 when the casing 11 rotates in the backward direction R relative to the rotor 12.

The present invention can include, but is not limited to, the present embodiment in which the vanes 122 include the respective flow passages 126 each passing through the both side surfaces 127a, 127b of the corresponding vane 122 along the rotation directions of the casing 11. Instead of or in addition to the vanes 122, the partitions 115 may include respective flow passages each passing through both side surfaces of the corresponding partition 115 along the rotation directions of the casing 11. In this case, check valves may be each installed to close the flow passage in the corresponding partition 115 when the casing 11 rotates in the forward direction N relative to the rotor 12 and to open the flow passage in the corresponding partition 115 when the casing 11 rotates in the backward direction R relative to the rotor 12.

In the case of defining the respective flow passages in the partitions 115, the first seal members 13 may each have a similar shape as that of the second seal member 14, namely a shape including the following portions: a bottom having a width lager than a circumferential length of an inner edge of the corresponding partition 115; a first leg integrally formed at one edge of the bottom and having a width larger than a radial width of the flow passage defined in the corresponding partition 115; and a second leg integrally formed at another edge of the bottom and having a width smaller than the radial width of the flow passage defined in the corresponding partition 115. Each first seal member 13 may function as a check valve to act as follows: when the casing 11 rotates in the forward direction N relative to the rotor 12, the first leg of the first seal member 13 abuts one side surface of the corresponding partition 115, thereby closing the flow passage in the corresponding partition 115; conversely, when the casing 11 rotates in the backward direction R relative to the rotor 12, the first leg of the first seal member 13 moves away from one side surface of the corresponding partition 115 and the second leg abuts another side surface of the corresponding partition 115, thereby opening the flow passage in the corresponding partition 115.

In the case of defining no flow passage 126 in each vane 122, the second seal members 14 may each have any shape as long as it can close the clearance gap between the front-end surface 125 of the corresponding vane 122 and the sidewall surface 114 within the circular cylindrical chamber 111 of the casing 11.

In the present embodiment, the axial force generation members 17 are attached to the partitions 115 provided in the circular cylindrical chamber 111 in the casing 11; however, the present invention is not limited this aspect. The first seal members 13 may be omitted. The second seal members 14 are similarly attached to the vanes 122 of the rotor 12, but the second seal members 14 may also be omitted.

In the present embodiment, each axial force generation member 17 including plastically or elastically deformable element is located between the back face 153 of the lid 15 and the top surface 119 of the corresponding partition 115, and thus screwing the lid 15 into the casing 11 causes the axial force. However, the present invention is not limited to this aspect. The casing 11 may be made of thermoplastic resin, including on the top surface 119 of each partition 115, as an integral portion of the casing 11, a protrusion to abut the back face 153 of the lid 15 and to act as an axial force generation portion. In this case, the screwing of the lid 15 into the casing 11 causes the axial force generation portions (the protrusions) to generate an axial force, thereby preventing external-leakage of the viscous fluid through the threaded interface between the external threaded portion 152 of the lid 15 and the internal threaded portion 117 of the casing 11, and also deforms the axial force generation portions plastically or elastically so as to allow an increasing leeway for adjustment of the clearance gap G1, thereby resulting in a wider adjustment range of the damping torque.

REFERENCE SIGNS LIST

1: rotary damper; 2: shaft; 3: brake arm;
4: brake pedal; 5: plate; 6: brake master cylinder;
11: casing; 12: rotor; 13: first seal member;
14: second seal member; 15: lid; 16a, 16b, 16c: O-ring;
17: axial force generation member; 18: protrusion; 111: circular cylindrical chamber;
19a, 19b: arm; 112: bottom of the circular cylindrical chamber 111;
113: opening section of the circular cylindrical chamber 111; 114: sidewall surface within the circular cylindrical chamber 111;
115: partition; 116: front-end surface of the partition 115;
117: internal threaded portion; 118: opening side of the circular cylindrical chamber 111;
119: top surface of the partition; 121: rotor body; 122: vane; 123a, 123b: end portion of the rotor body 121;
124: outer circumferential surface of the rotor body; 125: front-end surface of the vane 122;
126: flow passage; 127a, 127b: side surface of the vane 122;
128: through hole of the rotor body 121; 129: top surface of the vane 122;
130: bottom of the first seal member 13; 140: bottom of the second seal member 14;
141,142: edge of the bottom 140 of the second seal member 14; 143: first leg of the second seal member 14;
144: second leg of the second seal member 14;
150: opening section of the lid 15; 151: outer circumferential surface of the lid 15;
152: external threaded portion; 153: undersurface of the lid 15;
170: body of the axial force generation member 17; 171: top surface of the body 170;
172: undersurface of the body 170; 173: arm;
174: adjustment portion; 175: first pushing portion;
176: distal end of the adjustment portion 174; 177: base portion of the adjustment portion 174;
178: second pushing portion; 179: side of the base portion 177;
180: top surface of the protrusion 18; 181: groove; 182: groove bottom;

183: side surface of the protrusions 18; 184: groove; 185: sidewall inside the groove 181;

190: outer circumferential surface of the casing 11; 191: curved portion; 192: supporting portion;

193: connecting portion; 194: flat surface; 195: supporting surface;

196: inner surface of the curved portion 191;

197: edge, closer to the supporting portion 192, of the curved portion 191;

198: outer surface of the curved portion 191;

199: base portion between the arms 19a, 19b; 200: outermost portion of the base portion 199;

201: edge, closer to the curved portion 191, of the supporting surface 195

The invention claimed is:

1. A rotary damper for a brake pedal of an automobile, the rotary damper comprising a rotor and a casing containing the rotor inside to allow relative rotation between the casing and the rotor, and being configured to generate a damping torque by rotating the casing in a forward direction relative to the rotor, wherein
the casing is made of thermoplastic resin and comprises a pair of arms projecting radially outward so as to hold, between the arms, a plate configured to rotate around a pedal rotation center in conjunction with the brake pedal;
an arm out of the arms, which is located downstream in the forward direction, comprising:
a curved portion having a constant width; and
a supporting portion that is located more distal than the curved portion is and that is configured to support the plate.

2. A rotary damper according to claim 1, wherein
the arm located downstream in the forward direction further comprises a connecting portion extending radially outward from the casing and being continuous with the curved portion.

3. A rotary damper according to claim 1, wherein
the casing comprises:
a circular cylindrical chamber filled by viscous fluid; and
a partition projecting radially inward from a sidewall surface within the circular cylindrical chamber and partitioning an inside of the circular cylindrical chamber;
the rotor comprises:
a rotor body in cylindrical shape, the rotor body having an outer circumferential surface located close to a front-end surface of the partition; and
a vane projecting radially outward from the outer circumferential surface of the rotor body and placing a front-end surface of the vane close to the sidewall surface within the circular cylindrical chamber to partition the inside of the circular cylindrical chamber; and
the rotary damper further comprises:
a flow passage formed in the partition or in the vane and passing through both side surfaces of the partition or of the vane along a rotation directions of the casing; and
a check valve configured to close the flow passage when the casing rotates in the forward direction relative to the rotor and to open the flow passage when the casing rotates in the backward direction relative to the rotor.

4. A rotary damper according to claim 2, wherein
the casing comprises:
a circular cylindrical chamber filled by viscous fluid; and
a partition projecting radially inward from a sidewall surface within the circular cylindrical chamber and partitioning an inside of the circular cylindrical chamber;
the rotor comprises:
a rotor body in cylindrical shape, the rotor body having an outer circumferential surface located close to a front-end surface of the partition; and
a vane projecting radially outward from the outer circumferential surface of the rotor body and placing a front-end surface of the vane close to the sidewall surface within the circular cylindrical chamber to partition the inside of the circular cylindrical chamber; and
the rotary damper further comprises:
a flow passage formed in the partition or in the vane and passing through both side surfaces of the partition or of the vane along a rotation directions of the casing; and
a check valve configured to close the flow passage when the casing rotates in the forward direction relative to the rotor and to open the flow passage when the casing rotates in the backward direction relative to the rotor.

5. A rotary damper according to claim 3, further comprising a first seal member and/or a second seal member, the first seal member filling in a clearance gap between the front-side surface of the partition and the outer circumferential surface of the rotor body, the second seal filling in a clearance gap between the front-end surface of the vane and the sidewall surface inside the circular cylindrical chamber.

6. A rotary damper according to claim 4, further comprising a first seal member and/or a second seal member, the first seal member filling in a clearance gap between the front-side surface of the partition and the outer circumferential surface of the rotor body, the second seal filling in a clearance gap between the front-end surface of the vane and the sidewall surface inside the circular cylindrical chamber.

7. A braking system comprising:
the rotary damper according to claim 1;
a shaft placed at the pedal rotation center;
a brake arm rotatably attached to the shaft and linked to a brake master cylinder;
the brake pedal attached to an end of the brake arm; and
the plate attached to the brake arm so as to rotate around the pedal rotation center in conjunction with the brake pedal,
wherein the rotor is fixed to the shaft to be prevented from rotating around the pedal rotation center;
the rotary damper is installed in such a manner that when a push of the brake pedal causes the plate to rotate around the pedal rotation center in the forward direction, the plate is supported by the supporting portion of the arm, which is located downstream in the forward direction, out of the arms and that when release of the brake pedal causes the plate to rotate around the pedal rotation center in a backward direction, the plate is supported by an arm, which is located upstream in the forward direction, out of the arms; and
the plate is located between and grasped by the arms so as not to interfere with a base portion between the arms.

8. A braking system comprising:
the rotary damper according to claim 2;
a shaft placed at the pedal rotation center;
a brake arm rotatably attached to the shaft and linked to a brake master cylinder;
the brake pedal attached to an end of the brake arm; and
the plate attached to the brake arm so as to rotate around the pedal rotation center in conjunction with the brake pedal, wherein the rotor is fixed to the shaft to be prevented from rotating around the pedal rotation center;

the rotary damper is installed in such a manner that when a push of the brake pedal causes the plate to rotate around the pedal rotation center in the forward direction, the plate is supported by the supporting portion of the arm, which is located downstream in the forward direction, out of the arms and that when release of the brake pedal causes the plate to rotate around the pedal rotation center in a backward direction, the plate is supported by an arm, which is located upstream in the forward direction, out of the arms; and the plate is located between and grasped by the arms so as not to interfere with a base portion between the arms.

9. A braking system comprising:
the rotary damper according to claim 3;
a shaft placed at the pedal rotation center;
a brake arm rotatably attached to the shaft and linked to a brake master cylinder;
the brake pedal attached to an end of the brake arm; and
the plate attached to the brake arm so as to rotate around the pedal rotation center in conjunction with the brake pedal,
wherein the rotor is fixed to the shaft to be prevented from rotating around the pedal rotation center;
the rotary damper is installed in such a manner that when a push of the brake pedal causes the plate to rotate around the pedal rotation center in the forward direction, the plate is supported by the supporting portion of the arm, which is located downstream in the forward direction, out of the arms and that when release of the brake pedal causes the plate to rotate around the pedal rotation center in a backward direction, the plate is supported by an arm, which is located upstream in the forward direction, out of the arms; and
the plate is located between and grasped by the arms so as not to interfere with a base portion between the arms.

10. A braking system comprising:
the rotary damper according to claim 4;
a shaft placed at the pedal rotation center;
a brake arm rotatably attached to the shaft and linked to a brake master cylinder;
the brake pedal attached to an end of the brake arm; and
the plate attached to the brake arm so as to rotate around the pedal rotation center in conjunction with the brake pedal,
wherein the rotor is fixed to the shaft to be prevented from rotating around the pedal rotation center;
the rotary damper is installed in such a manner that when a push of the brake pedal causes the plate to rotate around the pedal rotation center in the forward direction, the plate is supported by the supporting portion of the arm, which is located downstream in the forward direction, out of the arms and that when release of the brake pedal causes the plate to rotate around the pedal rotation center in a backward direction, the plate is supported by an arm, which is located upstream in the forward direction, out of the arms; and
the plate is located between and grasped by the arms so as not to interfere with a base portion between the arms.

11. A braking system comprising:
the rotary damper according to claim 5;
a shaft placed at the pedal rotation center;
a brake arm rotatably attached to the shaft and linked to a brake master cylinder;
the brake pedal attached to an end of the brake arm; and
the plate attached to the brake arm so as to rotate around the pedal rotation center in conjunction with the brake pedal,
wherein the rotor is fixed to the shaft to be prevented from rotating around the pedal rotation center;
the rotary damper is installed in such a manner that when a push of the brake pedal causes the plate to rotate around the pedal rotation center in the forward direction, the plate is supported by the supporting portion of the arm, which is located downstream in the forward direction, out of the arms and that when release of the brake pedal causes the plate to rotate around the pedal rotation center in a backward direction, the plate is supported by an arm, which is located upstream in the forward direction, out of the arms; and
the plate is located between and grasped by the arms so as not to interfere with a base portion between the arms.

12. A braking system comprising:
the rotary damper according to claim 6;
a shaft placed at the pedal rotation center;
a brake arm rotatably attached to the shaft and linked to a brake master cylinder;
the brake pedal attached to an end of the brake arm; and
the plate attached to the brake arm so as to rotate around the pedal rotation center in onjunction with the brake pedal,
wherein the rotor is fixed to the shaft to be prevented from rotating around the pedal rotation center;
the rotary damper is installed in such a manner that when a push of the brake pedal causes the plate to rotate around the pedal rotation center in the forward direction, the plate is supported by the supporting portion of the arm, which is located downstream in the forward direction, out of the arms and that when release of the brake pedal causes the plate to rotate around the pedal rotation center in a backward direction, the plate is supported by an arm, which is located upstream in the forward direction, out of the arms; and
the plate is located between and grasped by the arms so as not to interfere with a base portion between the arms.

\* \* \* \* \*